(12) United States Patent
Mathé et al.

(10) Patent No.: US 11,302,940 B2
(45) Date of Patent: Apr. 12, 2022

(54) METHOD FOR SHUTTING DOWN A GENERATOR UNIT HAVING A FUEL CELL DEVICE

(71) Applicants: AVL List GmbH, Graz (AT); Nissan Motor Co., Ltd., Yokohama (JP)

(72) Inventors: Jörg Mathé, Graz (AT); Daiki Tanaka, Kawasaki (JP)

(73) Assignees: AVL List GmbH, Graz (AT); Nissan Motor Co., Ltd., Yokohama (JP)

( * ) Notice: Subject to any disclaimer, the term of this patent is extended or adjusted under 35 U.S.C. 154(b) by 477 days.

(21) Appl. No.: 16/322,973

(22) PCT Filed: Aug. 2, 2017

(86) PCT No.: PCT/EP2017/069541
§ 371 (c)(1),
(2) Date: Feb. 4, 2019

(87) PCT Pub. No.: WO2018/024776
PCT Pub. Date: Feb. 8, 2018

(65) Prior Publication Data
US 2019/0181471 A1   Jun. 13, 2019

(30) Foreign Application Priority Data

Aug. 2, 2016  (AT) .............................. A 50704/2016

(51) Int. Cl.
*H01M 8/04303*      (2016.01)
*H01M 8/04082*      (2016.01)
(Continued)

(52) U.S. Cl.
CPC ... *H01M 8/04303* (2016.02); *H01M 8/04089* (2013.01); *H01M 8/04201* (2013.01);
(Continued)

(58) Field of Classification Search
CPC ......... H01M 8/04343; H01M 8/04328; H01M 8/04955; H01M 8/04303; H01M 8/04201; H01M 8/04089; H01M 8/04231
See application file for complete search history.

(56) References Cited

U.S. PATENT DOCUMENTS

2004/0115491 A1* 6/2004 Cargnelli .......... H01M 8/04768
429/413
2005/0233187 A1* 10/2005 Pastula ............. H01M 8/04231
429/423
2011/0111310 A1   5/2011 Pastula et al.

FOREIGN PATENT DOCUMENTS

EP          2336083        6/2011
JP       2013-165042       8/2013
(Continued)

OTHER PUBLICATIONS

International Search Report and the Written Opinion dated Oct. 25, 2017 From the International Searching Authority Re. Application No. PCT/EP2017/069541. (9 Pages).

*Primary Examiner* — Stephan J Essex

(57) ABSTRACT

The present invention relates to a method for shutting down a generator unit (1) comprising a fuel cell device (100) having the steps (a) shutdown of a current generation via a control unit (510); (b) detection of at least one anode temperature of an anode (122) of the fuel cell device (100), in particular during a cool-down process; (c) blocking of an escape of carbon monoxide from an anode chamber (120) in which the anode (122) is arranged at least partially, in particular, at least for the most part, completely, if the anode temperature is higher than the first limit temperature $T_1$; (d) at least partial removal of carbon monoxide from an anode chamber (120) in which the anode (122) is arranged at least in part, in particular, at least for the most part, completely, if the anode temperature falls below a first limit temperature (Continued)

$T_1$. The present invention further relates to a generator unit (1), a vehicle having this generator unit (1) and a use of this generator unit (1).

20 Claims, 1 Drawing Sheet

(51) Int. Cl.
*H01M 8/04089* (2016.01)
*H01M 8/04223* (2016.01)
*H01M 8/04228* (2016.01)
*H01M 8/0432* (2016.01)
*H01M 8/04955* (2016.01)
*H01M 8/0612* (2016.01)
*H01M 8/12* (2016.01)

(52) U.S. Cl.
CPC ... *H01M 8/04228* (2016.02); *H01M 8/04231* (2013.01); *H01M 8/04328* (2013.01); *H01M 8/04343* (2013.01); *H01M 8/04955* (2013.01); *H01M 8/0618* (2013.01); *H01M 2008/1293* (2013.01); *H01M 2250/20* (2013.01); *Y02E 60/50* (2013.01); *Y02T 90/40* (2013.01)

(56) References Cited

FOREIGN PATENT DOCUMENTS

| | | |
|---|---|---|
| JP | 2007-533084 | 7/2021 |
| WO | WO 2005/101556 | 10/2005 |

\* cited by examiner

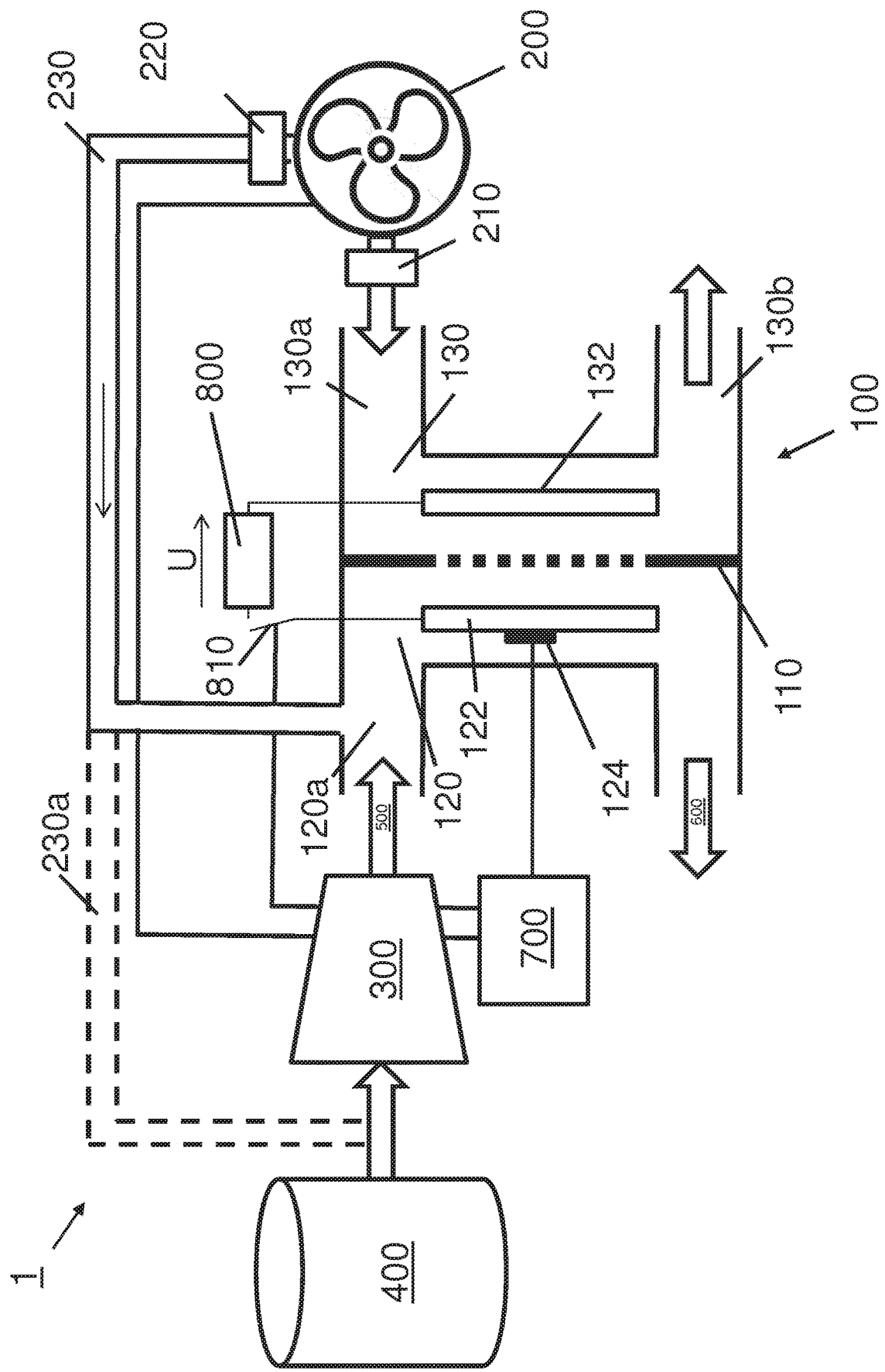

METHOD FOR SHUTTING DOWN A GENERATOR UNIT HAVING A FUEL CELL DEVICE

RELATED APPLICATIONS

This application is a National Phase of PCT Patent Application No. PCT/EP2017/069541 having International filing date of Aug. 2, 2017, which claims the benefit of priority of Austrian Patent Application No. A50704/2016 filed on Aug. 2, 2016. The contents of the above applications are all incorporated by reference as if fully set forth herein in their entirety.

FIELD AND BACKGROUND OF THE INVENTION

The present invention relates to a method for shutting down a generator unit having a fuel cell device, a generator unit having a fuel cell device, a vehicle having such a generator unit and the use of a generator unit of the type described here.

Fuel cells have been known in theory since the middle of the 19th century. A "fuel cell device" for the purposes of the present invention is a galvanic cell that converts the chemical reaction energy of a continually supplied fuel and an oxidant into electrical energy. This may also be referred to as so-called "cold combustion."

The operation of the fuel cell device is based here on the redox reaction, in which the reduction and oxidation take place in physical separation, specifically at an interface between anode and electrolyte or between electrolyte and cathode. This redox reaction is preferably a reaction of oxygen with the fuel, in particular hydrogen or carbon monoxide. On the cathode side, there is preferably an excess of oxygen, while on the anode side there is a shortage of oxygen, because the oxygen that is present immediately reacts with the fuel, for example, with the hydrogen. Because of this concentration gradient, the oxygen diffuses from the cathode to the anode. However, because the electrolyte in between is permeable only for oxygen ions and not for oxygen molecules, the oxygen molecule picks up two electrons at the boundary between cathode and electrolyte, whereby it becomes an ion and can penetrate the barrier. Once it has arrived at the boundary, it reacts catalytically with the fuel gas, giving off heat and corresponding combustion products and surrendering two additional electrodes [sic] to the anode. A requirement for this is an electrically conductive connection between anode and cathode in which a current flow is created that can be used for operating different conductively connected systems.

The use of this technology in automobiles has been the subject of research by a plurality of automotive companies for more than 20 years. Conventional fuel cells generally use gaseous hydrogen as fuel for the fuel cell.

In particular for application as an APU, a solid oxygen fuel Cell (SOFC) is preferably used that is in particular a high-temperature fuel cell having an operating temperature of 650° C. to 1,000° C. The electrolyte in this type of cell in one embodiment comprises a solid ceramic material that can conduct oxygen ions and simultaneously has an insulating effect for electrons. The oxygen-ion-conduction electrolyte is preferably provided as a thin membrane in order to be able to transport the oxygen ions using minimal energy. This works especially well at high temperatures. The outer side of the cathode facing away from the electrolyte is surrounded by air; the outer side of the anode, by fuel gas. Unused air and unused fuel gas, as well as combustion products, are preferably suctioned off. Because of their intrinsic properties, cathodes and/or anodes comprise nickel; in particular, anodes and/or cathodes are, at least for the most part, formed from nickel.

WO 2005/101556 A1 relates to a method and a device for shutting down a solid oxide fuel cell by means of steam flushing (steam purging), which has a physical flushing effect, whereby carbon monoxide reformate and free oxygen are removed from the anode, thereby minimizing the likelihood of nickel oxide and nickel tetracarbonyl formation.

SUMMARY OF THE INVENTION

It is an object of the present invention to provide an improved method for shutting down a generator unit having a fuel cell that increases the total operational life of the fuel cell and/or minimizes emissions.

The present object is achieved by a method for shutting down a generator unit having a fuel cell according to claim 1, as well as by a generator unit according to claim 11, a vehicle having such a generator unit according to claim 16, and the use of a generator unit of the type described here according to claim 18.

The present object is achieved according to one aspect by a method for shutting down a generator unit having a fuel cell, comprising the steps:
(a) Shutdown of current generation via a control unit;
(b) detection of at least one anode temperature of an anode of the fuel cell device, in particular during a cool-down process;
(c) blocking of an escape of carbon monoxide from an anode chamber in which the anode is arranged at least in part, in particular, at least for the most part, completely if the anode temperature is higher than a first limit temperature $T_1$; and
(d) at least partial removal of carbon monoxide from the anode chamber if the anode temperature falls below the first limit temperature $T_1$.

The present invention is based in particular on the insight that the gas mixture in the anode chamber during the operation is low in oxygen, as previously explained.

As previously explained, the operating temperature of solid oxide fuel cells is usually above 600° C. When shutting down or switching off the fuel cell, this cools, falling from the operating temperature in the direction of the ambient temperature. As soon as the current flow is interrupted, the nickel in the anode can react in the presence of oxygen to become nickel oxide, which can reduce the efficiency and the operational life of the fuel cell.

During the cooling process, however, the anode passes through the temperature range from 200° C. to 100° C. below the decomposition temperature of nickel tetracarbonyl. In this temperature range, the nickel in the anode can react with the carbon monoxide to form nickel tetracarbonyl $Ni(CO)_4$. Nickel tetracarbonyl is a highly toxic and dangerous gas, which can escape in the event of leakage or if the system must be opened for maintenance operations.

Oxidation of the anode, in particular of the nickel-containing anode, can therefore be at least minimized, in particular prevented, after a shutdown, in particular if the anode is still very warm and therefore also possibly highly reactive, by preventing the gas, which is still in the anode chamber from the operating phase, in particular the carbon monoxide, from escaping during the first phase of the cool-down process.

However, if carbon monoxide were still in the anode chamber, nickel tetracarbonyl would form in the anode chamber as soon as the anode temperature sank below a decomposition temperature during the cooling-down process. Because preventing nickel tetracarbonyl from forming has a higher priority according to one embodiment than preventing anode oxidation, the carbon monoxide is at least in part removed from the anode chamber if the anode temperature falls below the first limit value $T_1$.

This is preferably accomplished if a purge gas is used on the anode side, preferably ambient air, which in particular requires no additional storage, in particular from an already existing gas delivery device for supplying the cathode, in order to remove carbon monoxide from the anode chamber. Ambient air is well suited for this purpose because it only has a carbon monoxide concentration of from 50-200 ppb (parts per billion) and is, at least for the most part, free from carbon monoxide. Additional components, which serve for production, storage and/or supply of steam, for example, can be omitted, at least for the most part.

This is particularly advantageous because an oxidation of the anode in particular containing nickel in a highly reactive anode temperature range above the decomposition temperature can at least be minimized, in particular prevented in a simple manner, and the formation of nickel tetracarbonyl can at least be minimized, in particular prevented, in particular while accepting an in particular reduced oxidation of the anode below the decomposition temperature of nickel tetracarbonyl.

A "generator unit" within the meaning of the present invention should be understood in particular as a device which provides electrical energy. A generator unit in the sense of the present invention is in particular a so-called Auxiliary Power Unit (APU), which provides electrical energy in a vehicle if the primary drive is switched off.

An "anode" within the meaning of the present invention is one of the two electrodes of the fuel cell device that has an electrically conductive material, in particular a metal or non-conductive material having an electrically conductive coating, or that is in particular made from such.

"Carbon monoxide" is to be understood in particular as a chemical compound constituted by carbon and oxygen having the empirical formula CO. Carbon mono-oxide or carbon monoxide are equivalent terms.

"Anode temperature" within the meaning of the present invention is to be understood in particular as a temperature of the anode, in particular of a surface region of the anode, in particular a region of the anode comprising nickel. It should be noted that the nickel tetracarbonyl in question forms, at least for the most part, on the surface of a region comprising nickel.

A "limit temperature" within the meaning of the present invention is in particular a threshold that is specified in particular for a control unit of the generator unit.

A "fuel cell device" in the sense of the present invention is in particular a device that by a chemical reaction converts a continuously supplied fuel into electrical energy as a result of a cold combustion. Included in this definition in particular are alkaline fuel cells (AFC), polymer electrolyte fuel cells (PEMFC), direct methanol fuel cells (DMFC), formic acid fuel cells, in particular—depending on the embodiment—having platinum and/or palladium, and/or ruthenium catalysts, phosphoric acid fuel cells (PAFC), molten carbonate fuel cells (MCFC), solid oxide fuel cells (SOFC), direct carbon fuel cells (SOFC, MCFC) and magnesium-air fuel cells (MAFC), depending upon the embodiment.

According to a preferred embodiment, fuel, in particular bio-ethanol and/or with water supplemented with ethanol and/or a gas reformed from it, is fed to the anode.

The fuel cell device is thus a single fuel cell or a composite of a plurality of fuel cells, in particular in the form of a fuel cell stack.

A "prevention" in the sense of the present invention is either an active operation, such as a closing of a valve, and/or a passive waiting. Preventing an escape means in particular that the carbon monoxide to a large extent or completely remains in the anode chamber.

According to an advantageous embodiment, the carbon monoxide is at least partly removed from an anode chamber around a section of the anode having nickel. This is particularly relevant in order to minimize, in particular to prevent, the formation of nickel tetracarbonyl.

According to another advantageous embodiment, the at least partial removal of carbon monoxide from the anode chamber occurs if the anode temperature is in a range between $T_2$ and $T_1$, wherein $T_2$ is lower than $T_1$.

This is especially advantageous because in this way this purging process only takes place during a relevant period, in particular when the nickel tetracarbonyl can form because of the anode temperature, so that otherwise a corresponding usage of gas and/or energy, in particular for operating the gas supply device, may be minimized, in particular avoided.

According to another advantageous embodiment, the method comprises the step:

(e) Stopping the at least partial removal of carbon monoxide if the anode temperature falls below a second limit temperature $T_2$ and/or the carbon monoxide was at least partially removed from the anode chamber, wherein $T_2$ is less than $T_1$.

This is particularly advantageous because in this manner the instant of stopping the at least partial removal of carbon monoxide from the anode chamber can either be oriented towards a temperature window relevant for the formation of nickel tetracarbonyl and/or also be even before the temperature drops below the limit temperature $T_2$, if the carbon monoxide has already been at least partly removed from the anode chamber.

If an oxygen-containing gas, in particular air, is used for the at least partial removal in order to force the carbon monoxide out of the anode chamber, a stopping of the at least partial removal, in particular as soon as the carbon monoxide has been at least partially removed from the anode chamber, is thus advantageous because, in this manner, no more oxygen (as a component of the ambient air) is supplied to the anode chamber than is necessary.

After stopping the at least partial removal of carbon monoxide, the remaining oxygen from the ambient air in the anode chamber can possibly still react with anode that in particular contains nickel. After the consumption of existing oxygen, the oxidation reaction comes to a standstill.

According to another advantageous embodiment, the first limit temperature $T_1$, at least for the most part, is greater than or equal to the decomposition temperature of nickel tetracarbonyl ($Ni(CO)_4$) and/or, at least for the most part, less than or equal to the formation temperature for nickel oxide.

A "formation temperature" in the sense of the present invention is a temperature at which a chemical compound forms because there is enough thermal energy starting at this temperature to initiate the chemical reaction.

A "decomposition temperature" in the sense of the present invention is a temperature limit, in particular an upper temperature limit, at which a chemical compound breaks down into its constituent parts, because starting at this temperature there is so much thermal energy present that either the atoms and/or the compound components oscillate so strongly that the atomic bonds no longer hold the atoms or partial compounds and/or other chemical reactions take place that release the partial compounds from the parent compound.

According to another advantageous embodiment of the method, the first temperature limit $T_1$ is, at least for the most part, greater than or equal to a decomposition temperature or an upper temperature at which nickel tetracarbonyl (Ni(CO)$_4$) is formed and/or the second limit temperature $T_2$ is, at least for the most part, less than or equal to a lower temperature at which nickel tetracarbonyl (Ni(CO)$_4$) is formed.

This is particularly advantageous because in this manner the beginning and/or the end of the removal of carbon monoxide from the one anode chamber is based on the intrinsic properties of at least one of the chemical compounds to be prevented, nickel tetracarbonyl and/or nickel oxide. This is particularly advantageous because in this manner the so-called purging of the anode chamber is limited to the region of the anode chamber relevant for the formation of nickel tetracarbonyl, which limits the necessary amount of purge gas and/or energy required for purging to a necessary level.

According to another advantageous embodiment, the first limit temperature $T_1$ is, at least for the most part, less than or equal to a lower temperature at which nickel oxide is formed and/or the second limit temperature $T_2$ is, at least for the most part, less than or equal to a decomposition temperature or upper temperature at which nickel tetracarbonyl (Ni(CO)$_4$) is formed or a lower temperature at which nickel tetracarbonyl (Ni(CO)$_4$) is formed.

This is advantageous in particular because the carbon monoxide is already largely or completely removed by a cooling to the decomposition temperature of nickel tetracarbonyl, and in some cases it is ensured also that carbon monoxide is no longer present in the entire temperature range that is critical with respect to the formation of nickel tetracarbonyl.

According to another advantageous embodiment of the present invention, the first limit temperature $T_1$ is less than 400° C. and/or is higher than 250° C., in particular is at least roughly 300° C., and/or the second limit temperature $T_2$ is less than 125° C. and/or is higher than 50° C., in particular at least roughly 100° C. According to one embodiment, this corresponds, at least for the most part, to the decomposition temperature of nickel tetracarbonyl or to the formation temperature of nickel tetracarbonyl having appropriate safety margins at the chemically required temperatures. This is particularly advantageous because in this manner measurement uncertainties of the anode chamber temperature sensor can be compensated and/or an appropriate pre- or after-run cycle can be prepared in order to ensure that, upon entering the critical time window for the formation of nickel tetracarbonyl, a substantial part of the carbon monoxide, in particular, at least for the most part, all of the carbon monoxide has already been removed from the anode chamber.

Temperature gradients between the different regions of the anode which contain nickel can also be monitored in this manner in order to ensure that, at least for the most part, no nickel tetracarbonyl is formed during the cooling process.

According to another advantageous embodiment of the present invention, the at least partial removal includes an evacuation of the anode chamber and/or a displacement of the carbon monoxide in the anode chamber by a different gas.

An "evacuation" in the sense of the present invention in particular means an extraction of the gas in the anode chamber, wherein no replacement gas flows in, so that a vacuum is created. The displacement of the carbon monoxide includes, at least for the most part, an introduction of a purge gas, which forces the carbon monoxide from the anode chamber. According to an advantageous embodiment, the filling or forced injection of a purge gas is combined with a suctioning of the type described here. This is especially advantageous because in this manner the anode chamber can be quickly freed of carbon monoxide.

According to another advantageous embodiment, the other gas, in particular the purge gas, has nitrogen and/or hydrogen and/or oxygen and/or ambient air; it is in particular for the most part formed from nitrogen and/or hydrogen and/or oxygen and/or ambient air. This is particularly advantageous because in this manner an already available gas and/or an easily accessible gas and/or an inexpensive gas is used to achieve the desired effect, avoiding, in particular preventing, the formation of nickel tetracarbonyl. Ambient air in particular can be advantageously used because it is available in almost unlimited quantities and at no additional cost.

According to another advantageous embodiment, the gas forced from the anode chamber is supplied, at least for the most part, to a cathode chamber via already existing gas-conducting connections, to be discharged from the fuel cell via a downstream gas outlet on the cathode side. This is particularly advantageous because in this manner, a separate gas line on the anode side can be omitted because the in particular already existing cathode-side outlet can be jointly used for the displaced carbon monoxide on the anode side.

According to another advantageous embodiment of the present invention, the different gas is led into a reformer and/or led in the flow direction upstream of the reformer, in particular to also remove carbon monoxide at least partially from the reformer.

A "reformer" in the sense of the present invention is in particular a device, into which a fuel starting material, in particular natural gas and/or ethanol, in particular bio-ethanol and/or water supplemented with ethanol, specifically bio-ethanol, is supplied and there converted into a fuel, in particular with the addition of heat, in particular a gas mixture comprising hydrogen, carbon dioxide and carbon monoxide. This is particularly advantageous because in this manner the fuel required to operate the fuel cell, in particular the gas mixture, does not have to be stored in this form from the outset, but can be stored in a more stable form and/or a form having a higher energy density and a conversion into the fuel is only created shortly—in particular, at least for the most part, immediately—before the reaction in the fuel cell.

"Bio-ethanol" in the sense of the present invention is to be understood as ethanol, which, at least for the most part, is produced from biomass or the biodegradable portions of waste. "AG ethanol" is a term used synonymously for this.

According to another advantageous embodiment, the present invention comprises the step (b):
  (b1) Detection of an inlet side anode temperature and
  (b2) Detection of an outlet side anode temperature.

This is particularly advantageous because in this manner a possible temperature gradient in the anode chamber can be recorded and can influence the determination of the instant of stopping the at least partial removal of carbon monoxide. This of course also applies, mutatis *mutandis*, for the determination of the instant of beginning the partial removal of carbon monoxide from the anode chamber.

A further aspect of the present invention relates to a generator unit comprising a fuel cell device having a cathode, which is arranged at least partly, in particular, at least for the most part, fully in a cathode chamber of the fuel cell device, and an anode, which is arranged at least partly, in particular, at least for the most part, fully in a anode chamber of the fuel cell device; a gas supply line, wherein an upstream end of the gas supply line is connected to an inlet side of the anode chamber that is connected to an inlet side of the anode chamber so as to conduct gas a gas discharge line, which is connected to an outlet side of the anode chamber so as to conduct gas; at least one anode temperature sensor; a gas supply device, which is connected to an upstream region of the gas supply line so as to conduct gas; a control device, which is provided, in particular set up, in order to monitor at least one anode temperature of the anode (122), in particular during a cooling process, in particular after a shutting down of a power generation by means of a switching device (810); to prevent a venting of carbon monoxide from an anode chamber (120) if the anode temperature is higher than a first limit temperature $T_1$; and to remove carbon monoxide at least partly from the anode chamber (120) if the anode temperature falls below the first limit temperature $T_1$.

A "gas supply line" or a "gas discharge line" in the sense of the present invention is in particular a pipe- or tube-shaped structure that is provided, in particular is set up, for the purpose of guiding a gas from an upstream opening of the structure to a downstream opening of the structure, wherein a gas flow volume is essentially constant for the most part from the upstream opening to the downstream opening.

An "anode temperature sensor" is in particular a sensor that registers a temperature of at least one region of the anode and converts it to an electrically or electronically processable signal. Anode temperature sensors in the sense of the present invention are in particular resistive, capacitive, inductive and/or optical sensors for determining a temperature.

A "gas supply device" in the present invention is to be understood in particular as a device that is provided, in particular is set up, for the purpose of providing a gas, in particular a different gas, in particular a purge gas, in particular by storing and/or providing and/or preparing, in particular filtering, this gas, or the like. Examples of gas supply devices in the sense of the present invention are in particular gas tanks, valves, drive devices, in particular fans and/or filters and/or intake manifolds or combinations, thereof.

A "control unit" within the meaning of the present invention is to be understood in particular as a device that is provided, in particular set up, for the purpose of receiving, in particular electronically, a signal of the anode temperature sensor, for processing and if necessary relaying a control signal to a different component, in particular the fuel cell device. A control unit within the meaning of the present invention comprises in particular a data processing device, in particular a microprocessor, and a data storage facility, in particular a non-volatile memory random access (random access memory, RAM).

The advantages and other advantageous embodiments of the method also apply, mutatis *mutandis*, in the same way for the present generator unit for which reason they are omitted at this point to prevent repetitions.

A preferred use of the generator unit according to the invention is in a land-bound vehicle, such as a personal motor vehicle and/or truck, as an auxiliary power unit (APU), in particular in order to provide electrical power for on-board systems if the drive system, for example an internal combustion engine with a connected alternator, is switched off.

Another preferred embodiment of the generator unit according to the invention is in a land-bound vehicle, such as a personal motor vehicle and/or truck, as a component of the primary drive. The electrical energy produced is used at least in part for driving the vehicle.

According to an advantageous embodiment, the gas delivery system has a fan; in particular, the gas delivery system is a fan.

A "fan" within the meaning of the present invention is in particular a turbo-engine that functions as a machine and which has an externally driven impeller rotating in a fan housing. Impellers are in particular impeller wheels, bevel wheels, helical wheels or the like. The above definition of a fan in particular includes axial ventilators, diagonal ventilators, radial ventilators, centrifugal ventilators and tangental or cross-flow fans. This is particularly advantageous because in this manner an, at least for the most part, continuous and/or adjustable air flow can be created that is directed past at least one side of the fuel cell device.

According to another advantageous embodiment, the gas supply device, is in particular additionally supplied, and is in particular set up, for the purpose of providing gas to the cathode chamber. This is particularly advantageous because in this manner a gas supply device that is already provided for the cathode side can also be used for the anode side. In this manner, the necessity for additional components, in particular an additional gas supply device for the anode side, is advantageously avoided.

According to another advantageous embodiment of the present invention, the generator unit is provided, in particular set up, to perform a method of the type described here.

The embodiments and advantages described here with respect to the method apply mutatis *mutandis* in the same manner for a correspondingly configured generator unit.

According to another advantageous embodiment, the generator unit additionally comprises a bypass line, which connects the gas supply device to the fuel cell device so as to conduct gas, in particular via a valve—in particular an adjustable one—and an additional control device that controls the valve of the bypass line.

This is particularly advantageous because in this manner an additional path is provided to remove carbon monoxide from the anode chamber, in particular in the event of a failure of the primary components and/or to increase operational safety if, for example, an emergency shutdown is provided following a total system failure.

An additional aspect of the present invention relates to a vehicle, in particular to a land-bound vehicle having a generator unit of the type described here. This is particularly advantageous because in this manner the advantages of the generator unit according to the invention, in particular the high energy efficiency, can be provided for daily usage, in particular such as for road transport, which can contribute to the reduction of pollutant emissions.

According to another advantageous embodiment, the vehicle further comprises a fuel reserve for provision of fuel, in particular ethanol, in particular bio-ethanol, and/or water mixed with ethanol, in particular bio-ethanol, wherein the fuel is supplied at least partially, in particular, at least for the most part, in particular completely, as reserve for the operation of the fuel cell device.

An additional aspect relates to the use of a generator unit of the type described here having a fuel cell for reducing, in particular, at least for the most part, for blocking, the formation of nickel tetracarbonyl Ni(CO)$_4$ during the shutdown of the generator unit and/or for the reduction, in particular for the at least substantial blocking, of an oxidation of an anode during the shutdown of the generator unit.

For reducing, in particular for preventing, oxidation of the anode during a shutdown, it is necessary to remove the oxygen from the anode chamber, in particular from a region of the anode containing nickel. By choosing an appropriate purge gas, these two unwanted effects (formation of nickel tetracarbonyl and oxidation of the anode) can be reduced, in particular, at least for the most part, prevented. This is especially advantageous because in this manner the performance of the fuel cell can be guaranteed for a long operational life.

BRIEF DESCRIPTION OF THE SEVERAL VIEWS OF THE DRAWINGS

Further objectives, advantages, features and applications of the present invention arise from the following description of the exemplary embodiments with reference to the drawings. In the drawing:

FIG. 1 An at least partial schematic representation of a generator unit according to one aspect of the present invention.

DESCRIPTION OF SPECIFIC EMBODIMENTS OF THE INVENTION

A fuel cell device 100 of a generator unit 1 according to the embodiment in FIG. 1 comprises an anode chamber 120 as well as a cathode chamber 130, which are separated from each other by an oxygen-ion permeable membrane 110. An anode 122 is arranged in anode chamber 120, in particular an anode comprising nickel. This is conductively connected via a control unit 810 and a consumer 800 to a cathode 132 in cathode chamber 130, in particular in the event of a closed control unit 810. On an inlet side 120a, anode chamber 120 is connected so as to conduct gas to a gas supply line 500. On an outlet side 120b of anode chamber 120, a gas supply line 600 is connected so as to conduct gas to anode chamber 120. A fuel reserve 400 is connected so as to conduct gas to a reformer 300, in which fuel from the fuel reserve is converted, in particular prepared, for use in the fuel cell, for example in that the hydrogen content of the fuel gas provided to the anode chamber via the gas supply line is converted, in particular increased.

For the general workings of a fuel cell, in particular of fuel cell device 100, the aforementioned embodiments are referenced to avoid repetitions.

A gas delivery device 200, in particular in the form of a fan, is connected so as to conduct gas to an outlet side 130a of cathode chamber 130 via a valve 210. Gas delivery device 200 is connected so as to conduct gas to inlet side 120a of anode chamber 120 via an additional valve 220 and a gas supply line 230. During operation of fuel cell device 100, gas delivery device 200 provides the necessary oxygen to the cathode in the form of ambient air. It is advantageous for the additional valve 220 to be closed during normal operation.

According to an alternative embodiment, indicated in FIG. 1 as a dashed line, gas delivery device 200 is connected to reformer 300 so as to conduct gas via an additional gas supply line 230a in order to clean the reformer as of result of removing the carbon monoxide.

Regarding the procedure for shutting down generator unit 1: If consumer 800 no longer needs power, control unit 810 is interrupted and with it the circuit connection between the cathode and the anode connected to it. The redox reaction described above can no longer take place. Anode 122, which has an operating temperature in a range between 600° C. and 1000° C. depending upon the embodiment, is monitored by an anode temperature sensor 124, which detects a temperature of the anode, in particular a surface temperature of anode 122, in particular of a region of the anode containing nickel. A control unit 700, which is electrically connected to anode temperature sensor 124, control unit 810 and additional valve 220, monitors the anode temperature, in particular if control unit 810 is opened, meaning during a cooling process. If the anode temperature falls below a first limit temperature $T_1$, carbon monoxide is at least in part, in particular, at least for the most part, fully removed from anode chamber 120. According to the embodiment in FIG. 1, this takes place if valve 210 is closed and additional valve 220 is opened so that ambient air is supplied to anode chamber 120 via gas supply line 230. This at least partial removal of carbon monoxide is terminated if the anode temperature falls below a second limit temperature $T_2$ and/or the carbon monoxide is at least partially removed from the anode chamber 120. Limit temperatures $T_1$ and $T_2$ are based on the decay and/or formation temperatures for nickel tetracarbonyl Ni(CO)$_4$. The gas to be removed from the anode chamber or the introduced and excess gas from gas supply device 200 is discharged from fuel cell device 100 via gas line 600.

Although exemplary embodiments were discussed in the preceding description, it should be noted that a plurality of variations is possible. In addition, it should be noted that the exemplary embodiments are only examples, which should in no way limit the scope of protection, the applications or design in any way. Instead, the preceding description should give the person skilled in the art a guideline for the implementation of at least one exemplary embodiment, wherein various changes can be undertaken, in particular with respect to the function and arrangement of the components described, without leaving the scope of protection that arises from the claims and these equivalent combinations of features.

LIST OF REFERENCE CHARACTERS

100 Fuel cell device
110 Membrane
120 Anode chamber
120a Inlet side of the anode chamber 120
120b Outlet side of the anode chamber 120
122 Anode
124 Anode temperature sensor
130 Cathode chamber
130a Inlet side of the cathode chamber 130
130b Outlet side of the cathode chamber 130
132 Cathode
200 Gas supply device
210 Valve
220 Additional valve
230 Gas supply line
230a Expanded gas supply line 300 Reformer
400 Fuel reserve
500 Gas supply line
600 Gas discharge line
700 Control device
800 Consumer
810 Control unit

What is claimed is:

1. A method for shutting down a generator unit comprising a fuel cell device, having the following steps:
   (a) shutdown of current generation via a control unit;
   (b) detection of at least one anode temperature of an anode of the fuel cell device;
   (c) blocking of an escape of carbon monoxide from an anode chamber in which the anode is arranged at least in part if the anode temperature is higher than a first limit temperature $T_1$;
   (d) At least partial removal of carbon monoxide from the anode chamber if the anode temperature falls below the first limit temperature $T_1$.

2. The method according to claim 1, wherein the at least partial removal of carbon monoxide from the anode chamber occurs if the anode temperature is in a range between $T_1$ and $T_2$, wherein $T_2$ is lower than $T_1$.

3. The method according to claim 1, further comprising the step:
   (e) Stopping the at least partial removal of carbon monoxide at least if the anode temperature falls below a second limit temperature $T_2$ or the carbon monoxide was at least partially removed from the anode chamber (120), wherein $T_2$ is lower than $T_1$.

4. The method according to claim 1, wherein at least the first limit temperature $T_1$ is, at, greater than or equal to a decomposition temperature or an upper temperature at which nickel tetracarbonyl ($Ni(CO)_4$) is formed or the second limit temperature $T_2$ is, at, less than or equal to a lower temperature at which nickel tetracarbonyl ($Ni(CO)_4$) is formed.

5. The method according to claim 1, wherein at least the first limit temperature $T_1$ is, at, less than or equal to a lower temperature at which nickel oxide is formed or the second limit temperature $T_2$ is, at, less than or equal to a decomposition temperature or upper temperature at which nickel tetracarbonyl ($Ni(CO)_4$) is formed or a lower temperature at which nickel tetracarbonyl ($Ni(CO)_4$) is formed.

6. The method according to claim 1, wherein at least the first limit temperature $T_1$ is than 400° C. or is higher than 250° C., or the second limit temperature $T_2$ is than 125° C. or is higher than 50° C.

7. The method according to claim 1, wherein the at least partial removal comprises at least an evacuation of the anode chamber or a displacement of the carbon monoxide in the anode chamber by another gas.

8. The method according to claim 7, wherein the other gas has at least nitrogen or hydrogen or oxygen or ambient air.

9. The method according to claim 7, wherein the other gas is at least introduced in a reformer or in the direction of flow in front of the reformer.

10. The method according to claim 1, wherein the step (b) has:
    (b1) detection of an inlet side anode temperature and
    (b2) detection of an outlet side anode temperature.

11. A generator unit, comprising:
    a fuel cell device having a cathode, which is arranged partially in a cathode chamber of the fuel cell device, and an anode, which is arranged at least partially, within an anode chamber of the fuel cell device;
    a gas supply line, wherein a downstream end of the gas supply line is connected to an inlet side of the anode chamber;
    a gas discharge line, which is connected to an outlet side of the anode chamber so as to conduct gas;
    at least one anode temperature sensor;
    a gas supply device, which is connected to an upstream region of the gas supply line so as to conduct gas;
    a control device, which is provided for this purpose;
    detecting at least one anode temperature of the anode;
    blocking an escape of carbon monoxide from an anode chamber if the anode temperature is higher than a first limit temperature $T_1$; and
    removing carbon monoxide at least in part from the anode chamber if the anode temperature falls below the first limit temperature $T_1$.

12. The generator unit according to claim 11, wherein the gas supply device has a fan.

13. The generator unit according to claim 11, wherein the gas supply device is supplied.

14. The generator unit according to claim 11, wherein the generator unit is provided for the purpose of carrying out a method for shutting down a generator unit comprising a fuel cell device, having the following steps:
    (a) shutdown of current generation via a control unit;
    (b) detection of at least one anode temperature of an anode of the fuel cell device;
    (c) blocking of an escape of carbon monoxide from an anode chamber in which the anode is arranged at least in part if the anode temperature is higher than a first limit temperature $T_1$;
    (d) At least partial removal of carbon monoxide from the anode chamber if the anode temperature falls below the first limit temperature $T_1$.

15. The generator unit according to claim 11, further comprising:
    a bypass line that connects the gas supply device (200) to the fuel cell device; and
    a further control device that drives the valve of the bypass line.

16. A vehicle having a generator unit, comprising:
    a fuel cell device having a cathode, which is arranged partially in a cathode chamber of the fuel cell device, and an anode, which is arranged at least partially, within an anode chamber of the fuel cell device;
    a gas supply line, wherein a downstream end of the gas supply line is connected to an inlet side of the anode chamber;
    a gas discharge line, which is connected to an outlet side of the anode chamber so as to conduct gas;
    at least one anode temperature sensor;
    a gas supply device, which is connected to an upstream region of the gas supply line so as to conduct gas;
    a control device, which is provided for this purpose;
    detecting at least one anode temperature of the anode;
    blocking an escape of carbon monoxide from an anode chamber if the anode temperature is higher than a first limit temperature $T_1$; and
    removing carbon monoxide at least in part from the anode chamber if the anode temperature falls below the first limit temperature $T_1$.

17. The vehicle according to claim 16, further comprising a fuel reserve for provision of fuel.

18. A use of a generator unit according to claim 11 comprising a fuel cell device at least for the reduction for the formation of nickel tetracarbonyl $Ni(CO)_4$ during the shutdown of the generator unit or for the reduction for of an oxidation of an anode during the shutdown of the generator unit.

19. The method according to claim 7, wherein the step (b) has:
(b1) detection of an inlet side anode temperature and
(b2) detection of an outlet side anode temperature;
wherein the following step is performed:
(b3) Introduction of the other gas in at least one region around the anode when the inlet side anode temperature is greater than $T_1$ and the outlet side anode temperature is less than $T_2$.

20. The vehicle according to claim 17, wherein the fuel reserve is at least of ethanol or water mixed with ethanol, wherein the fuel is supplied as reserve for the operation of the fuel cell device.

* * * * *